US007818152B2

United States Patent
Balz et al.

(10) Patent No.: US 7,818,152 B2
(45) Date of Patent: *Oct. 19, 2010

(54) COMPUTERIZED METHOD AND SYSTEM FOR MATURITY ASSESSMENT OF BUSINESS PROCESSES

(75) Inventors: Wilfried Balz, Aidlingen (DE); Wolfgang Fritz Dette, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 144 days.

This patent is subject to a terminal disclaimer.

(21) Appl. No.: 11/533,599

(22) Filed: Sep. 20, 2006

(65) Prior Publication Data

US 2008/0027790 A1    Jan. 31, 2008

Related U.S. Application Data

(63) Continuation of application No. 10/196,545, filed on Jul. 16, 2002, now Pat. No. 7,136,792.

(30) Foreign Application Priority Data

Jul. 20, 2001    (EP)    ................... 01117541

(51) Int. Cl.
G06G 7/48    (2006.01)
(52) U.S. Cl. ............................... 703/6; 705/7

(58) Field of Classification Search .................... 705/11, 705/7; 703/6
See application file for complete search history.

(56) References Cited

U.S. PATENT DOCUMENTS 5,765,138 A * 6/1998 Aycock et al. ................. 705/7
7,136,792 B2 * 11/2006 Balz et al. ...................... 703/6

OTHER PUBLICATIONS

Bamford, R.C. Deibler, W.J., II. "Standards-comparing, contrasting ISO 9001 and the SEI capability maturity model", Computer, Oct. 1993, vol. 26, Issue 10, pp. 68-70.*

* cited by examiner

*Primary Examiner*—Beth V. Boswell
*Assistant Examiner*—Adrian J McPhillip
(74) *Attorney, Agent, or Firm*—George R. McGuire; David B. Woycechowsky; Bond Schoeneck & King, PLLC

(57) ABSTRACT

A computer implemented method and system for comparative analysis of business processes, in particular for process maturity evaluation. A process vitality index (PVI) is mapped onto a binary decision tree that provides unambiguous, YES/NO questions at its nodes. A user is guided by these questions. The tree provides the minimum required steps for an evaluation based on common process characteristics. At least two of the nodes of the binary decision tree are interlinked in view of interdependencies between categories to enforce specific YES/NO inputs and thus provide an automated consistency check at each node.

2 Claims, 10 Drawing Sheets

FIG. 4

| | Control Items | Initial sub Score | Medium sub Score | Full sub Score | Max. Value | Attained Value |
|---|---|---|---|---|---|---|
| Phase 1: Definition, Ownership, Description and Release | | | | | | |
| Step 1 | Define process | ○Yes ⦿No Definition | ○Yes ⦿No Definition | ○Yes ⦿No Definition | 3 | 0 |
| Step 2 | Assign Ownership | ○Yes ⦿No Definition | ○Yes ⦿No Definition | ○Yes ⦿No Definition | 3 | 0 |
| Step 3 | Determine customer requirements | ○Yes ⦿No Definition | ○Yes ⦿No Definition | ○Yes ⦿No Definition | 3 | 0 |
| Step 4 | Describe process | ○Yes ⦿No Definition | ○Yes ⦿No Definition | ○Yes ⦿No Definition | 3 | 0 |
| Step 5 | Educate employees | ○Yes ⦿No Definition | ○Yes ⦿No Definition | ○Yes ⦿No Definition | 3 | 0 |
| Step 6 | Establish Business Control | ○Yes ⦿No Definition | ○Yes ⦿No Definition | ○Yes ⦿No Definition | 3 | 0 |

FIG. 5A

| | Value | a) Initial Score | b) Medium Score | c) Full Score |
|---|---|---|---|---|
| Phase 1: Definition, Ownership, Description, and Release | | | | |
| 1.Define process | 3 | Process mission is defined ● | Process customers and suppliers are identified. Input and Output are defined. | Process/Subprocess structures are defined; functions involved and their tasks are described. ● |
| 2.Control Items | 3 | Process-Owner is nominated. ● | Process definition term is nominated; related education is completed | Management System is in place; required reviews are established. ● |
| 3.Determine customer requirements | 3 | Method to obtain customer user requirements is in place | Customers have reviewed their requirements and agreed. ● | Process ensures transformation of customer requirements. |
| 4.Describe process | 3 | Process flow is described. Guidelines and Corporate Instructions are considered required. T support is defined. | Process performance indicators have been defined. ● | Control points for achieving indicators are in place; baseline is determined. |
| 5.Educate employees | 3 | Skill requirements to perform the process are defined and documented. | Skill of process participants has been identified; education plan to close gap is in place ● | Skill gap will be monitored; education of process participants is on schedule. |
| 6.Establish Business Control | 9 | Areas of business risks within this process are identified and documented. ● | Sufficient controls are defined and implemented to mitigate business risks | Control measurements are established to ascertain that controls are functioning properly. ● |
| 7.Release Process & Ensure Deployment | 3 | Documentation has been released and is available to all process participants ● | All process participants have been trained and work in accordance to process documentation | Effective application of the released process approach is ensured through regular checks. ● |

To be able to achieve further points, the process must at least meet minimum criteria (cells marked with ●)

| | Value | a) Initial Score | b) Medium Score | c) Full Score |
|---|---|---|---|---|
| Phase 2: Process Management and Improvement | | | | |
| 8. Analyze process & Install Measurement System | 12 | Most important goals out of Cycle Time, Defect Elimination, Process costing, Customer Satisfaction are defined; results are reviewed at least once a year | Measurement results will be interpreted through statistical methods; Reporting system is established. | Correlation between process and results can be demonstrated; results will be analyzed and used for process improvements. |
| 9. Establish Improvement process/Define Operational Improvements | 13 | System improvement method has been established (e.g. Process Reviews); Process user provide process performance data. | Possibilities for improvements have been identified, action plans have been released. | Action plans have been realized; targets for improvement actions have been achieved. |
| 10. Implement Improvements continuously | 12 | Continuous "root-cause-analysis" used to identify further potentials for improvement. | Further improvements have been realized; target for improvement actions are achieved continuously | Customer requirements are achieved continuously. |
| 11. Business Risks reviewed | 6 | Process was included in a Corporate Audit, Business Controls (BC) review, or self-assessment within last 12 months. | | Corporate Audit, BC review, or self-assessment which included the process reported no or only minor control issues within last 12 month. |
| Phase 3: Process Benchmarking | | | | |
| 12. Benchmark process and, dependent on results, | 10 | Internal/external benchmarking has been executed:"where are others better? How do they achieve this?" | Based on the results of benchmarking, significant possibilities for improvement have been identified; (Re-engineered). | Process performance targets are in accordance with benchmarking results; action plans for achievement are in place. |
| 13. Process proves to be competitive | 10 | Benchmarking as a tool for process improvement is an integral part of process-work. | Benchmark-results have been realized; competitiveness of the process can be proven. | Customers feedback no negative statements ("dissatisfied" or "very dissatisfied") |
| Phase 4: "World Class" Process | | | | |
| 14. Process is superior to competitors | 10 | Process demonstrates in external comparisons to be the absolute low-cost process. | Operational cost of quality are calculated continuously; benchmark-results show lowest cost for defects, and comparable cost for defect prevention; | Process is superior to competitors processes in direction of customer satisfaction |

FIG. 6

| Control Items | Points Max, actual gap | | a)Initial Score | b)Medium Score | c)Full Score |
|---|---|---|---|---|---|
| Phase 1: Definition, Ownership, Description, and Release | | | | | |
| 1. Define process | 3 | | 1 | +1 | +1 |
| 2. Assign Ownership | 3 | | 1 | +1 | +1 |
| 3. Determine customer requirements | 3 | | 1 | +1 | +1 |
| 4. Describe process | 3 | | 1 | +1 | +1 |
| 5. Educate employees | 3 | | 1 | +1 | +1 |
| 6. Establish Business Control | 9 | | 3 | +3 | +3 |
| 7. Release Process & Ensure Deployment | 3 | | 1 | +1 | +1 |
| Total Phase 1 | 27 | cum, 27 | | | |
| Phase 2: Process Management and Improvement | | | | | |
| 8. Analyze process & install Measurement System | 12 | | 4 | +4 | +4 |
| 9. Establish improvement process / Define operational improvements | 13 | | 4 | +4 | +5 |
| 10. Implement improvements continuously | 12 | | 4 | +4 | +4 |
| 11. Business Risks reviewed | 6 | | 3 | +0 | +3 |
| Total Phase 2 | 43 | cum, 70 | | | |
| Phase 3: Process Benchmarking | | | | | |
| 12. Benchmark process and, dependent on results, | 10 | | 3 | +3 | +4 |
| 13. Process proves to be competitive | 10 | | 3 | +3 | +4 |
| Total Phase 3 | 20 | cum, 90 | | | |
| Phase 4: "World Class" Process | | | | | |
| 14. Process is superior to competitors' | 10 | | 3 | +3 | +4 |
| Total Phase 4 | 10 | cum,100 | | | |

601

COMPUTERIZED METHOD AND SYSTEM FOR MATURITY ASSESSMENT OF BUSINESS PROCESSES

CROSS-REFERENCE TO RELATED APPLICATIONS

The present application is a continuation of and claims priority to U.S. patent application Ser. No. 10/196,545, filed Jul. 16, 2002, now allowed, which claims priority to European Application No. 01117541.1, filed Jul. 20, 2001.

FIELD OF THE INVENTION

The present invention generally relates to the field of business process management and more specifically to a computer implemented method and system for comparative maturity analysis of business processes.

BACKGROUND OF THE INVENTION

In the early and mid-1980s, many industry and government leaders found that a renewed emphasis on quality was a necessity for doing business in an ever-expanding, and more demanding, competitive world market. Many businesses either did not believe quality mattered or did not know where to begin. For more than a decade, process management has been a main part of modern management systems. Total quality management models like the model of the Malcolm Baldridge National Quality Award or the model of the European Foundation for Quality Management established in 1988 provide one of seven categories (MBNQA) or nine criteria (EFQM) weighted in the range of 10-14% for the evaluation of quality and performance of processes.

Process management, according to the 1997 criteria, is examined by key aspects including customer-focused design, product and service delivery processes, support processes, and supplier and partnering processes involving all work units. A category examines how key processes are designed, effectively managed, and improved to achieve better performance.

As an example, one way to measure a business is through the production or delivery processes. For instance, a precision manufacturing company measured its on-time delivery service. They stated "On-time delivery indicates a positive trend over time" rising from 87 percent in 1990 to 99.94 percent in 1995.

Process management can also be measured by the management of support services. For instance, a consumer support services company is in the process of restructuring and reducing the workforce size. To help manage this, its parent corporation has developed a transition center to answer any questions or concerns of employees. They are also helping new associates by initiating services until they can find new employment within or outside the company.

Nowadays, large enterprises or companies are increasingly changing from a function-oriented to a process-oriented management approach. Thus, enterprise- or company-wide comparability of the quality of single processes becomes a predominant issue in managing business processes within such an enterprise. But continuous improvement of such quality management systems, on such a large scale, is rendered difficult as processes of different technical or administrative areas have to be evaluated and made comparable to each other.

Another important factor for successful process management is to ascertain that essential characteristics of a process are taken into account, such as identification of suppliers and customers of a sales process or determination and specification of the corresponding process parameters, training of the process users and continuous improvement of the process via gathering and analyzing the parameters or benchmarking over time in a predefined order.

It is further known to evaluate process performance of business or development processes of large enterprises or companies by using a so-called process maturity or "Process Vitality Index" (PVI). The PVI allows assessment of the maturity of processes defined and managed according to the ten-step method described e.g. in "Anleitung fuer die Durchfuehrung der Prozessarbeit", IBM Deutschland GmbH, Nov. 10, 1995. The PVI has to be established manually.

Further, "1998 Self Assessment Guidelines for Companies", EFQM Brussels Representative Office, EFQM Issue 6, September 1996 and the "Malcolm Baldridge National Quality Award 1997—Criteria for Performance Excellence", issued by the U.S. Department of Commerce, proposed to build assessment teams which aggregate and consolidate the individual assessments in consensus sessions.

Another approach is to use printed or computer-assisted questionnaires to obtain a picture of the personality of a company's customers.

Although the known approaches have already implicitly implemented decision trees for the provision of assessment criteria—an example of a corresponding scoring matrix of the Malcolm Baldridge National Quality Award (MBNQA) and a derived decision tree is depicted in FIG. 1—they are disadvantageous insofar as they are based only on written criteria and related scorings to be read and applied by individuals. To avoid subjective assessment results and disregard of dependencies and exclusions in the criteria, the individual assessors have to participate in comprehensive training for calibrating their individual results. Furthermore, assessment teams have to be built in order to aggregate and consolidate the individual assessments in consensus sessions.

SUMMARY OF THE INVENTION

It is therefore an object of the present invention to provide an improved method and system for comparative maturity analysis of business processes, in particular a computer implemented method and system for the analysis of business processes.

It is a further object to provide such a method and system where process maturity assessment is accomplished, as much as possible, in an automated way thus requiring minimum user interaction.

Another object is to provide such a method and system which provide a valid, reliable and/or objective assessment for the maturity of processes even in different business fields.

It is still another object to provide such a method and system not requiring comprehensive training of an assessor.

It is yet another object to provide a single score which allows comparison of the maturity of business processes even those of different business fields.

The invention includes a computer-implemented process maturity evaluation scheme wherein a known process maturity evaluation scheme like the above mentioned process vitality index (PVI) is mapped onto a binary decision tree, the decision tree providing unambiguous, easy to answer YES/NO questions at its nodes, thus securely guiding a user or assessor through the entire evaluation process, based on these questions.

The invention thus allows analysis of the maturity of processes defined and managed according to the ten-step method described above in a way that minimizes individual judgment by an assessor. The proposed questions or queries, in particular, are independent of the technical content of the respective underlying process. Thus validity, reliability and objectivity of process maturity assessments are ascertained without a special education effort in assessment techniques.

As a further achievement, the invention provides a measure to compare results of process management efforts for the complete process scope of an enterprise or a company.

In a preferred embodiment the invention provides the minimum required steps for an evaluation scheme which is based on common process characteristics. The computerized method thus allows a reduction of the evaluation of those characteristics based on easy-to-answer YES/NO questions then resulting in a comparative score.

In another advantageous embodiment, at least some of the nodes of the binary decision tree are interlinked in view of certain interrelationships between the corresponding categories in order to enforce specific YES/NO inputs required due to inter-dependencies between categories in the whole tree hierarchy. These enforced inputs thus provide an automated consistency or plausibility check at each node of the decision tree.

The final score obtained from a process analysis according to the invention is more objective than the scores obtained by the aforementioned prior art approaches.

In addition, the method and system according to the invention allow for a comparative analysis or evaluation of processes of different business fields. For instance, they allow comparison of the maturity of e.g. a fulfillment process with a product or service development process.

According to a further embodiment, the invention provides an automated weighting of inputs concerning particular questions, which is transparent to the assessor.

It should be noted that the term "business process", in the present context, includes but is not limited to development, manufacturing and sales processes but excludes only technical processes like chemical or physical processes.

BRIEF DESCRIPTION OF THE DRAWINGS

In the following a preferred embodiment of the invention will be described in detail referring to the accompanied drawings from which further features and advantages of the invention become evident.

FIG. 4 shows an exemplary graphical user interface (GUI) for the IT implementation of PVI assessment;

FIG. 5 A-B show two tables depicting a detailed overview of the check matrix shown in FIGS. 3A and 3B for the assessment phases shown in FIG. 2;

FIG. 6 shows an exemplary score scheme for the check matrix shown in FIGS. 5A and 5B;

DETAILED DESCRIPTION OF THE INVENTION

Figure 1:
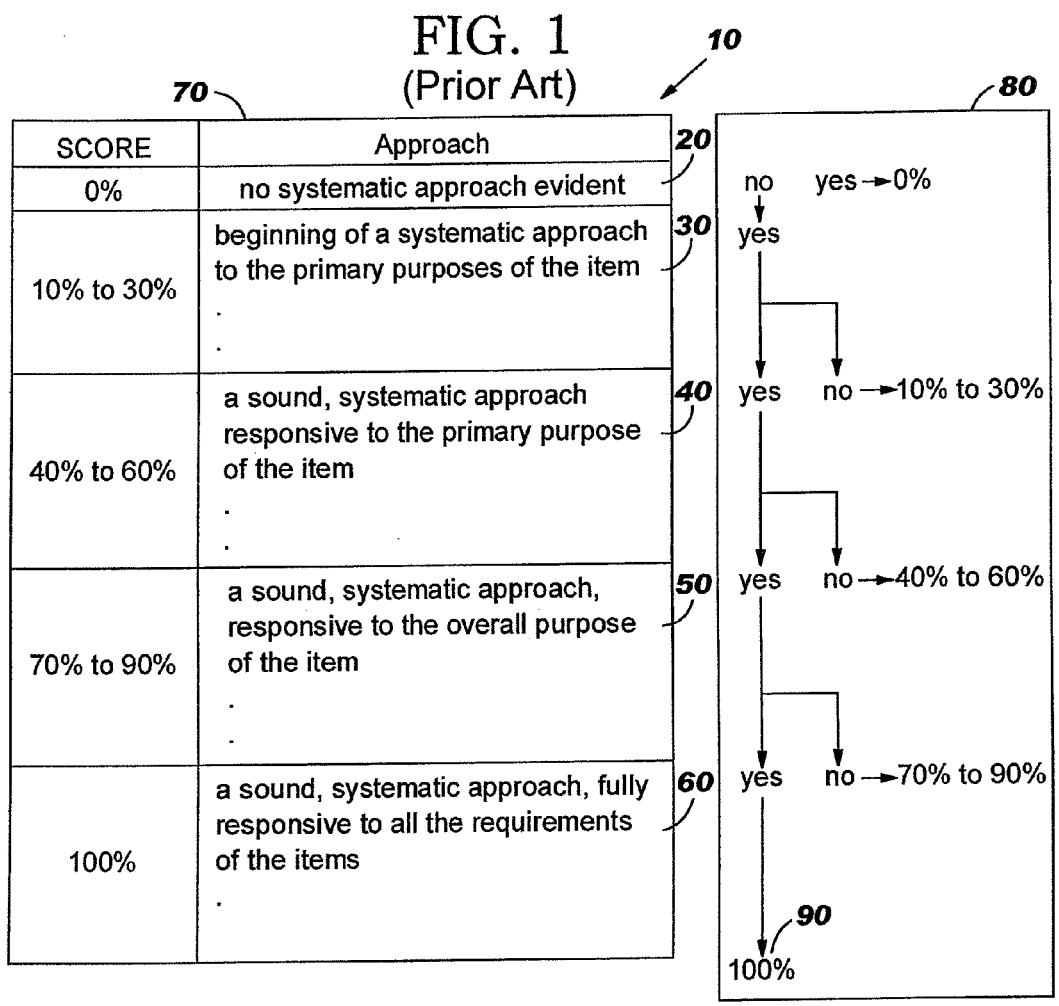
FIG. 1 shows a process validity index (PVI) approach for assessment of maturity of a process according to the prior art.

FIG. 1 shows a PVI assessment scheme according to the prior art. A table 10, depicted in the left-hand side in FIG. 1, provides five categories 20-60 designated as "approaches" in the right-hand column. Each of the categories 20-60 is assigned a score 70 which is 0% for the first category 20 "no systematic approach evident" and 100% for the last category 60 "a sound systematic approach". The remaining three categories 30-50 in between the first 20 and the last category 60 are assigned percent ranges such as 10% to 30%.

A decision tree 80 depicted in the right-hand of FIG. 1 illustrates how the above mentioned five categories 20-60 are evaluated to obtain a final score 90. If all categories 20-60 are answered with "YES" then the final score 90 is 100%. If one or more category of these categories 20-60 is (are) answered with "NO" then the final score 90 will lie between 0% and 100%.

Figure 2:
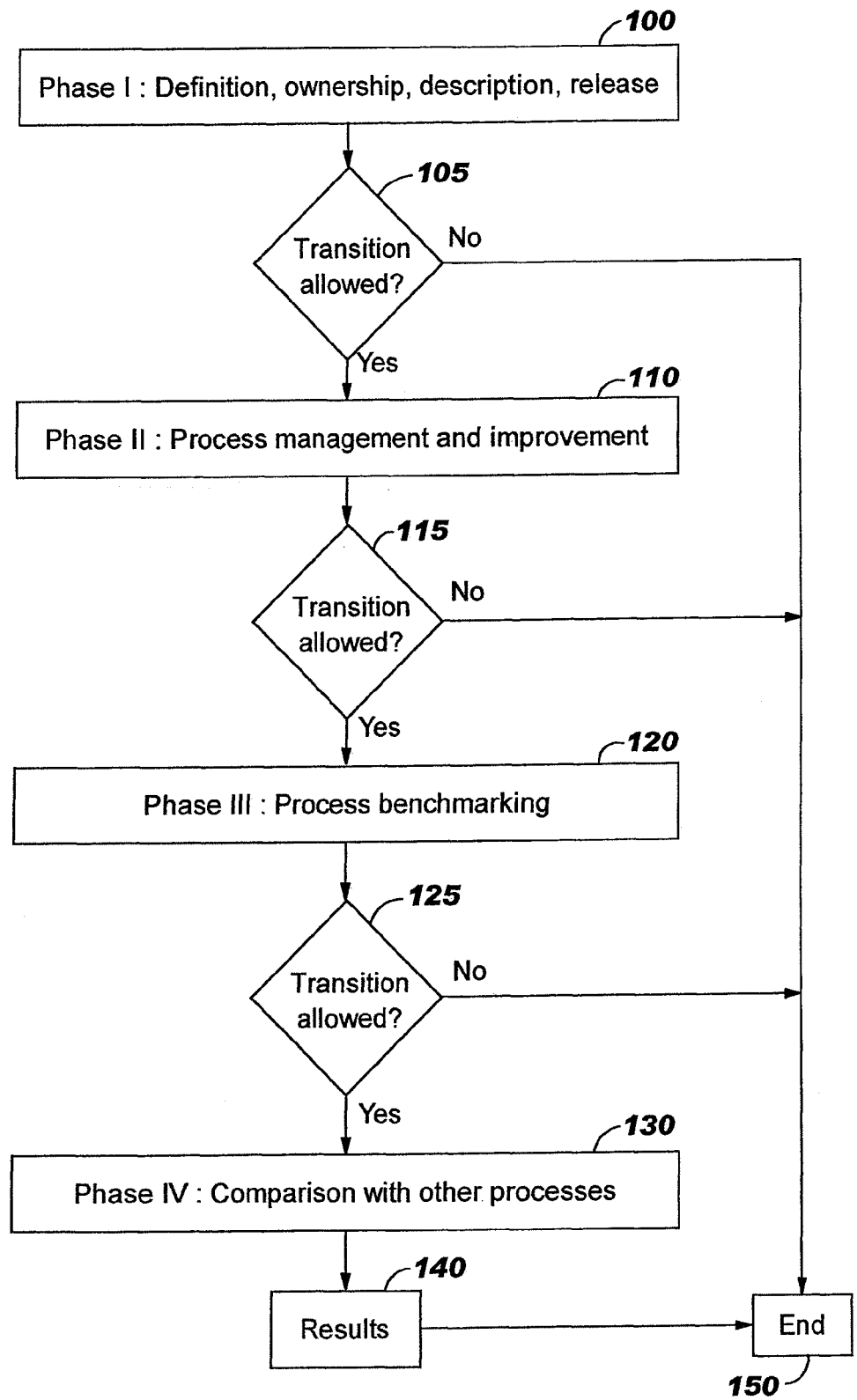
FIG. 2 is an overview showing different phases of a PVI assessment scheme in accordance with the invention.

In the following, a preferred embodiment of the invention will be described. The overview diagram shown in FIG. 2 illustrates four exemplary assessment phases 'I'-'IV' 100-130 used by a knowledge-based (closed) data processing system (FIG. 8) according to the preferred embodiment.

It is noteworthy that the invention can also be implemented as an expert system wherein the proposed binary input scheme or the corresponding graphical user interface provides an intelligent data I/O device, wherein the contents at each node of an underlying binary tree (FIG. 7A-7C) are stored in a knowledge/rule base, and wherein the revealed subscores and the final score are input to an inference engine that delivers a final recommendation or assessment result based on these scores.

In phase I (FIG. 2, step 100) a check is made to determine whether the business process under evaluation is already defined, its ownership assigned, a detailed description of the process provided and released to all participating instances. The above criteria are checked by way of different steps, each step including one or more questions to be answered only with YES or NO. If a set of minimum criteria is fulfilled, transition to phase II is automatically approved (step 105) and the assessor thus can continue with phase II. In other words, transition between the above described two phases, and between the other phases accordingly, is dependent upon certain requirements being fulfilled in the respective preceding phase.

In phase II, (step 110) developments and improvements of process management are checked, e.g. whether a measurement round is already performed or the like. Before proceeding to phase III (step 120), where process benchmarking for the business process under evaluation is performed and where the process under evaluation is compared with other processes in the same or a different business field (steps 120, 125), a check is made to determine whether transition from phase II to phase III is allowed (step 115). For example benchmarking might not be performed prior to having performed the above mentioned measurement round. Finally, a business process having passed phase IV, (step 130) is marked as superior to other competitive processes in the results (step 140), and the process ends (step 150). It is emphasized that the above four process assessment phases 100-130 are only exemplary and thus alternative schemes which use different quantities and/or types of phases will be envisioned by those skilled in the art once taught the invention.

Figure 3A:
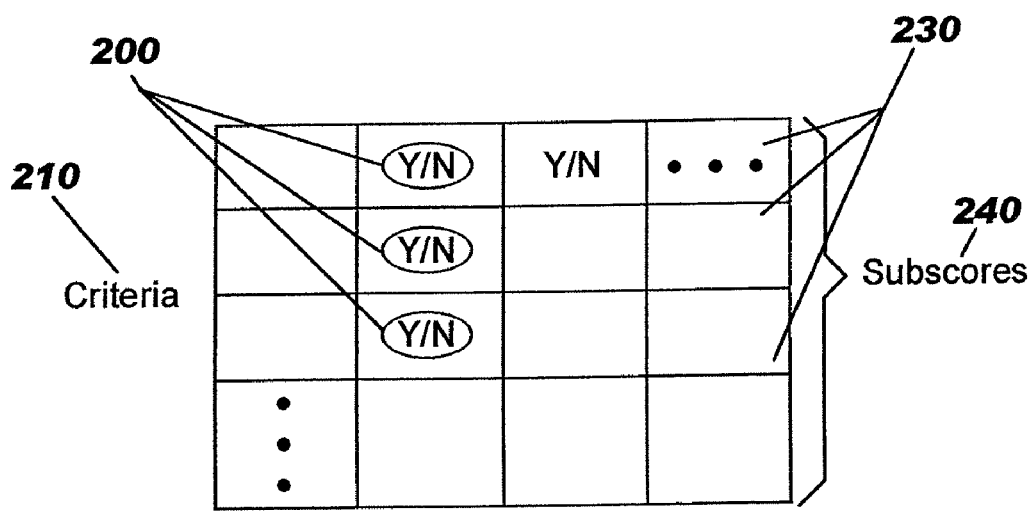
FIG. 3A shows schematic views of a check matrix of an IT implementation of a PVI assessment scheme according to the invention.

FIG. 3A shows a PVI assessment scheme according to the invention which can be implemented using a Lotus Notes™ database, as illustrated hereinafter referring to FIG. 4. In the shown assessment scheme, the rows are assigned to categories, each category comprising criteria 210 related to process levels, each of these levels being process-type independent. The columns represent the degree of fulfillment of each of the criteria 210 wherein the YES/NO answers to the questions in each of the fields 230 add to a subscore 240 and the sum of the subscores 240 reveals a score dependent on the degree of fulfillment of a respective criterion. All fields 230 may be weighted in accordance with the underlying PVI evaluation model. Finally, the revealed scores in each category 210 are summed in order to provide a final score for the underlying process.

For evaluating the PVI of a process, the proposed scheme interfaces with the assessor in the form of unambiguous, easy to answer YES/NO questions 200. This ensures that the answers to the questions are related to a decision tree (FIGS. 7A-7C) derived from the assessment criteria 210 and transformed in the respective sub-scores 240 which are aggregated to the final score, as described above, without need of any user knowledge and user intervention.

The assessment criteria for the PVI are based on the aforementioned ten-step method. As the criteria are solely based on process management steps rather than on the technical content of the underlying processes, the resulting score is independent of the purpose of the processes. Thus it is possible to compare the PVI of processes, evaluated by the PVI implementation, to easily identify the most mature process within an organization.

Figure 7A:
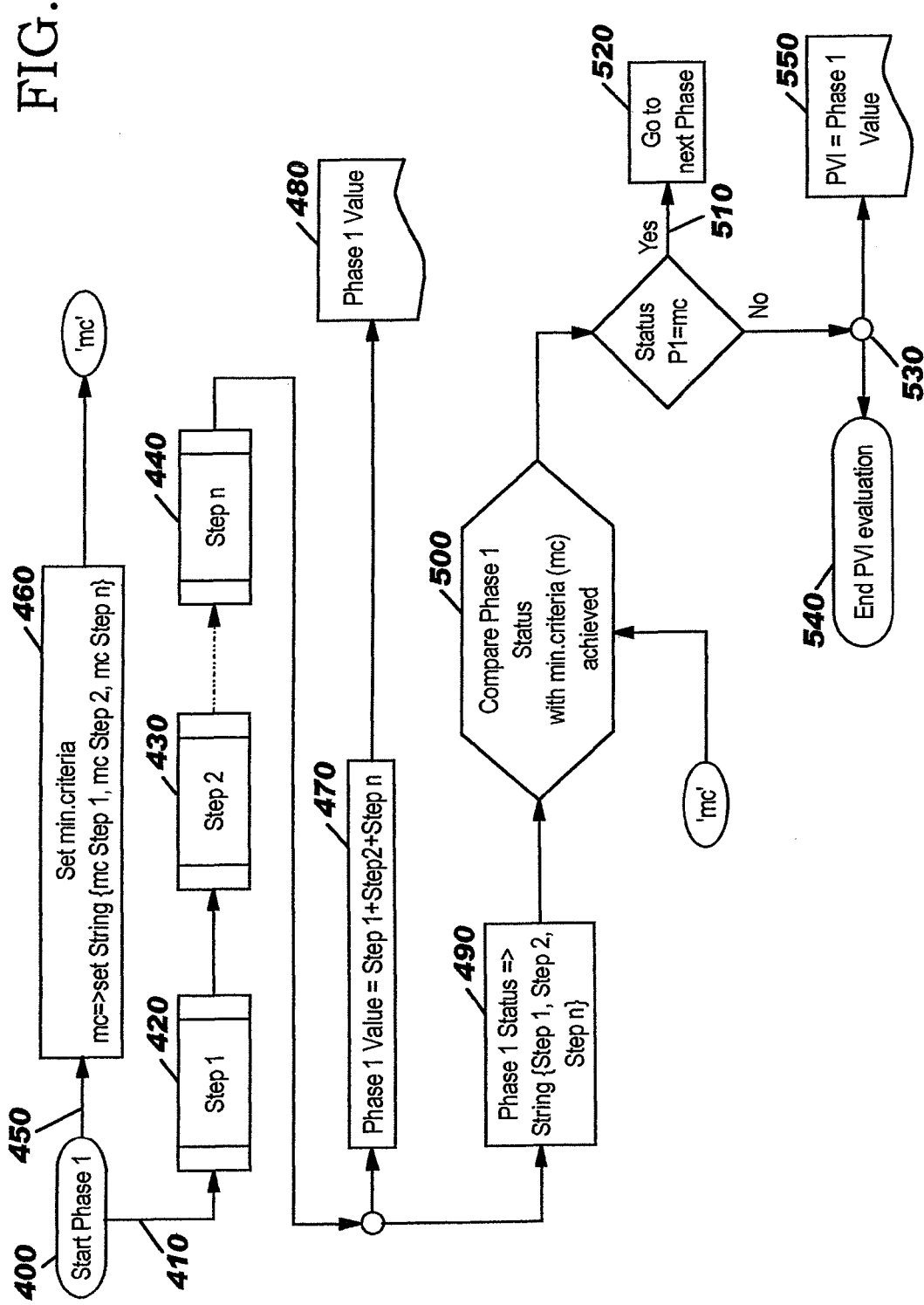
FIG. 7 A-C show an exemplary process flow of a preferred embodiment of a computer implemented PVI assessment tool according to the invention by way of four consecutive flow diagrams.
Figure 7B:
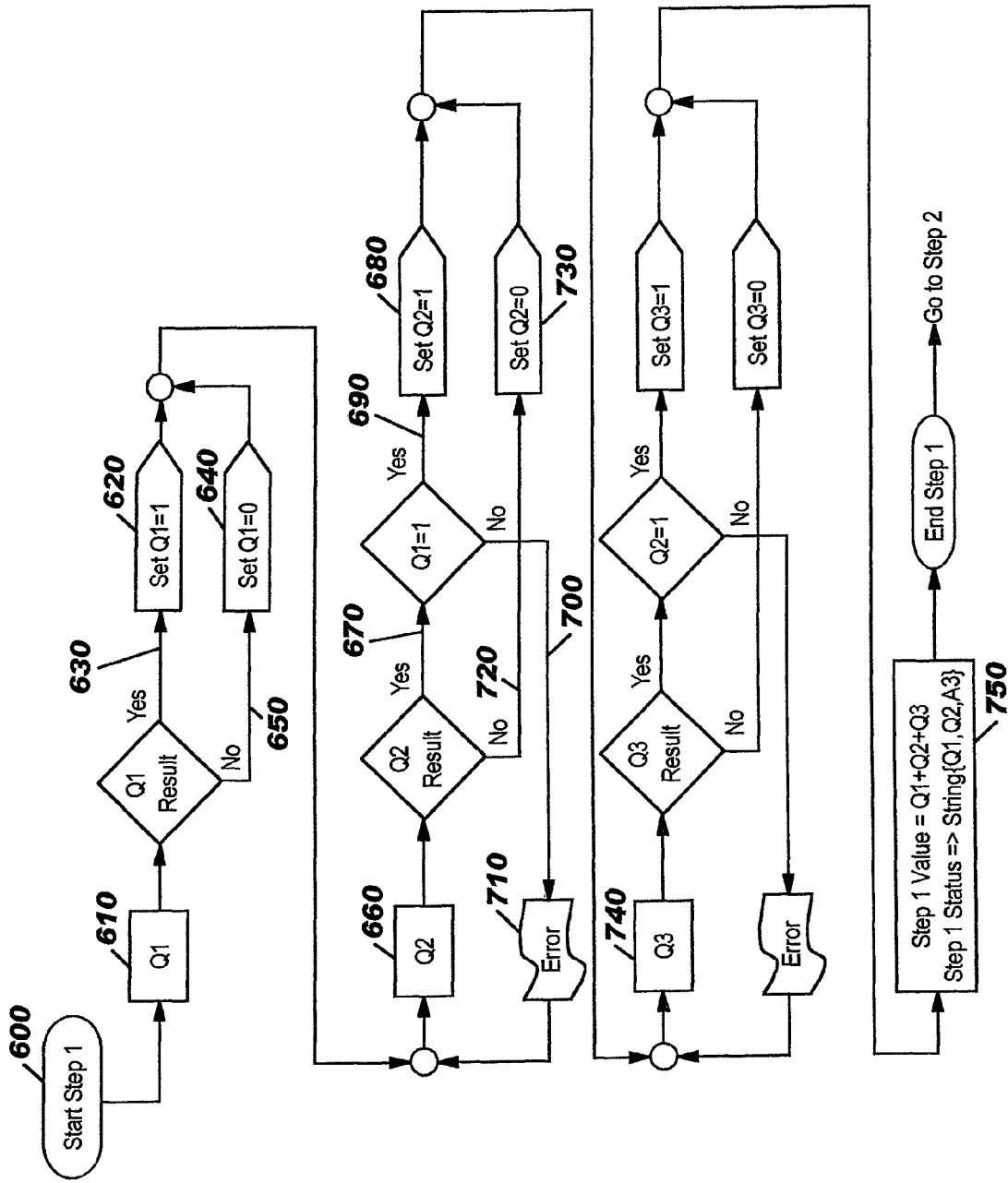
Figure 7C:
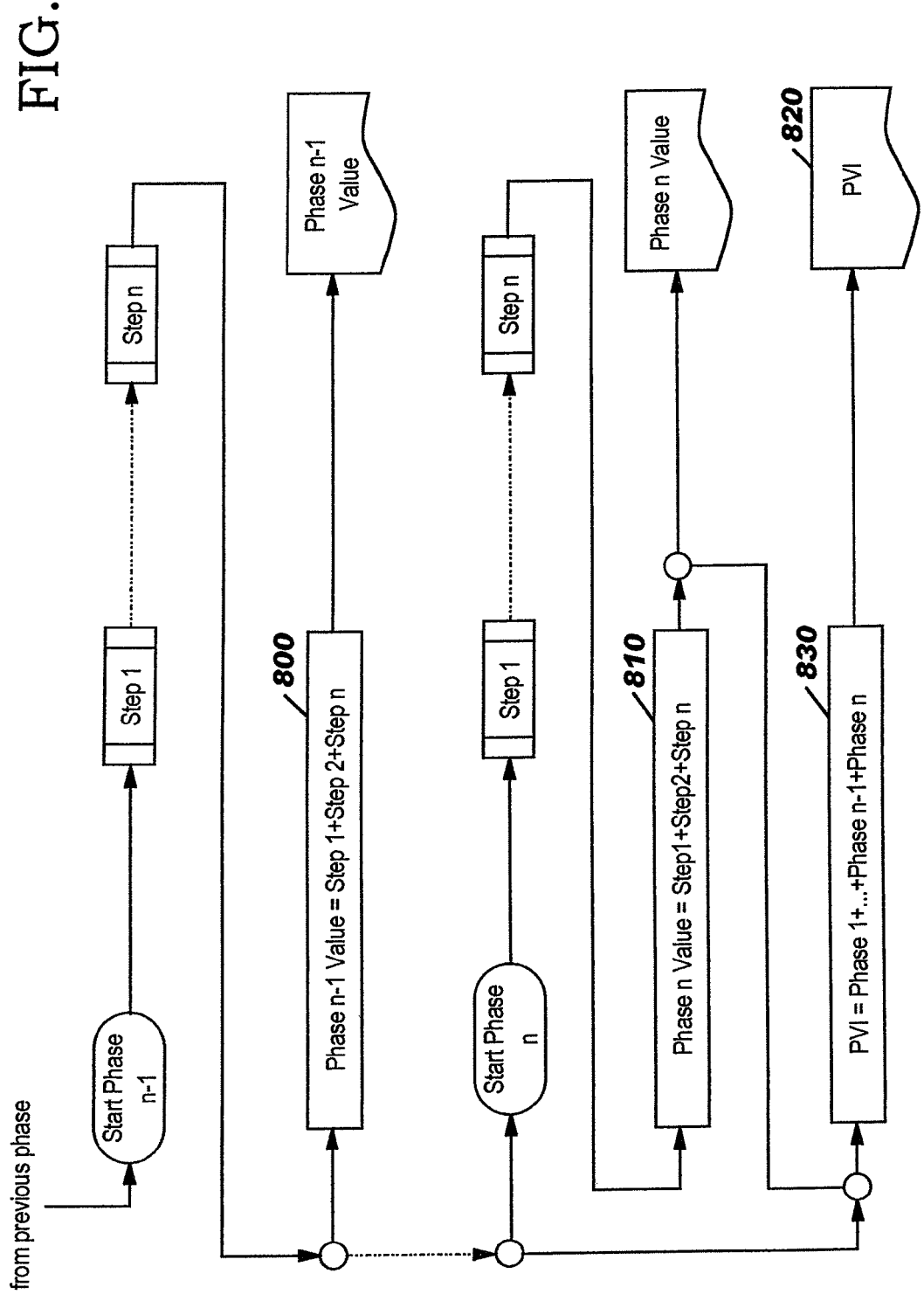

In order to ascertain that determining the PVI is independent of any interpretation of the meaning of characteristics, the known PVI scheme is mapped onto the prementioned decision tree, the details of which are shown in FIGS. 7A-7C, where each node provides a question which can only be answered by 'YES' or 'NO.' By entering YES or NO, the score assigned to a corresponding criterion is provided to an adder. Having finished the entries to a graphical user interface (GUI) 401 as that depicted in FIG. 4, the adder automatically calculates the final score for the PVI.

Based on the scheme depicted in FIG. 3A, an according computer implemented PVI assessment tool considers the knowledge required to work the decision tree correctly and consistently and guides the user or assessor accordingly. In a first step, the questions to be answered by the assessor are grouped to the above described phases I-IV 100-130, within these phases to certain steps, and within these steps to successive triples of scores. Next, the tool ensures that the respective user or assessor answers the questions equally so that the workout of the implicit decision tree is not arbitrary. Specifically, the tool ensures that all questions are to be answered.

Figure 3B:
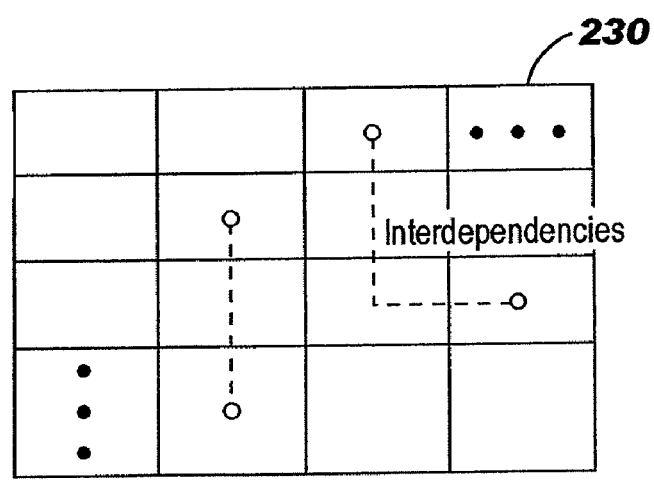
FIG. 3B is a similar view of a check matrix for illustrating handling of interdependencies between different categories of the matrix depicted in FIG. 3A in accordance with the invention.

For logically interlinked questions within a step, as described beforehand, it is ensured that a question can only be answered with YES, if the question preceding the question to be answered in the same step was already answered with YES. The corresponding interlinkage between fields 230 is illustrated in FIG. 3B. Any question answered correctly in the above sense with YES automatically adds a score value to the PVI which reflects the corresponding weight of this answer in the PVI scheme. Any question answered with NO adds a zero score value to the PVI.

Thus, the described enforced way to answer the questions ensures that the resulting PVIs are comparable with each other without having to perform any calibration of the assessors as is presently required for corresponding assessment procedures known in the art.

It is emphasized that the proposed scheme provides multiple criteria ordered into categories, e.g. ten categories in the present example, wherein these categories characterize different process maturity levels. All criteria are defined independently of process type. For each category, in this embodiment three subscores are provided corresponding to different degrees of fulfillment of the underlying category. Single categories or even criteria are pre-weighted transparently to the assessor.

It should be noted that the subscores, in addition, can be advantageously used for further improvements of the business process under evaluation.

All criteria are defined only as YES/NO questions and the assessor has the only choice to enter a YES or a NO thus avoiding subjective entries. As a result, the shown scheme provides a final score which is much more objective than final scores obtained from prior art approaches.

As mentioned above, FIG. 3b schematically illustrates how the aforementioned interdependencies between different criteria (here of different categories) are handled by the enforcement principles described above. First a consistency check is made at each criterion or category where it is determined whether the answer for a criterion depends on a previous criterion. This procedure ensures that particular process steps cannot be answered with 'YES' if prerequisite necessary steps are not also answered with 'YES'. In such a case the assessor is notified of that inconsistency, and informed that the current answer is "NOT ACCEPTED" as the necessary presumptions are not fulfilled.

FIG. 4 depicts a typical appearance of a graphical user interface 401 (GUI) used for the PVI process assessment tool and for implementing the above described assessment scheme. Particularly shown is a window used for phase I of the entire assessment procedure. It provides a single window that serves as a tool for assisting an assessor to perform the necessary steps for the PVI based comparative analysis of at least two business processes, e.g. a product sales and a product development process.

In the GUI 401, the above described YES/NO inputs at each field 230 are realized by corresponding YES/NO buttons 290 wherein below each button 290 a definition 295 of the underlying field 230 can be presented. Criteria contained in the left column 300 answered with 'YES' reveal an initial subscore with a value greater than zero. Otherwise, the initial subscore will be zero. Criteria contained in the second column 310 answered with 'YES' raise the subscore, but only if the initial subscore is not zero. Accordingly, criteria included in the right column 320 answered with 'YES' also raise the subscore greater than zero, but also only if the criteria contained in the second column 310 were answered with YES. In column 350 the maximum achievable value for the subscores in each row 370 is provided. In addition, in column 360 the currently attained sum of the subscore values is provided.

Fields comprising the above mentioned interrelationships between phases may be so marked, for example by shading or highlighting. This means that any field in the next phase can only be answered if all of the marked fields were answered with 'YES'. In contrast to that, the fields surrounded by dashed line 330 comprise fields with no such interdependency.

The contents of the categories of the proposed assessment scheme are depicted in FIGS. 5A and 5B in greater detail. As mentioned above, these categories correspond to certain process development stages, not depending on the specific content of an underlying process stage. As mentioned above, for each category a number of criteria, preferably three criteria corresponding to the aforementioned subscores, are defined.

The details of these criteria are also depicted in FIGS. 5A and 5B in detail. As the categories, the criteria are defined also without dependence on the purpose of a process. The pre-described forced guidance of the user is implemented in such a way, that to be able to achieve further scores, the process must at least meet the minimum criteria indicated by marked cells.

The two tables 501 and 502 depicted in FIGS. 5A and 5B, respectively, give a more detailed overview of the typical meaning of the categories and criteria used in the check matrix shown in FIGS. 3A and 3B and the GUI 401 shown in FIG. 4 for the assessment phases shown in FIG. 2. In phase I, the meaning of the first two categories 'Define process' and 'Assign ownership' relate to common process requirements, namely a clearly defined process and a nominated process owner. The other categories of phase I relate to customer requirements, documentation and training issues concerning the process, and an according risk assessment. For each category, three different stages of fulfillment of each of the categories are provided, previously called criteria and relating to certain score values between an 'Initial Score', a 'Medium Score' and a 'Full Score'. These Scores are described in more detail referring to FIG. 6.

To be able to achieve further scores, the process under evaluation must at least meet the minimum criteria indicated by the cells' interrelationships. For instance, in step 4 (504) a process flow including Guidelines and IT support must be established, before process performance indicators can be defined. This kind of interrelationship is met by way of a forced guidance implemented using the above minimum criteria approach. Another example of interrelationship is step 7 (507) where regular checks for effective application of a released process can only be implemented after all process participants have been trained to work in accordance with the process.

The further evaluation steps included in phases II-IV relate to management and improvement of an already released business process in order to provide a dynamic process performance optimization. Phase II thereby includes criteria for four different categories relating to process analysis and risk management. Phase III, which concerns process benchmarking, includes two categories relating to conducting internal and/or external benchmarking, e.g. with business processes in different business fields within or outside an enterprise or company, and use of the respective benchmarking results for further process improvement. In phase IV, there is only one category, which includes three different criteria. As mentioned above, a business process with a full score in this category is superior to competitive processes. The other two criteria corresponding to Initial Score and Medium Score relate to low-cost fulfillment of the process under evaluation.

FIG. 6 depicts an exemplary score scheme 601 for the check matrix shown in FIGS. 5A and 5B including all phases. As can be seen, most of the criteria comprise different scores thus providing weighted scores. The single score values can be obtained empirically and, as mentioned above, are valid independently of the respective underlying business field.

Now referring to FIGS. 7A-7C, the detailed process and data flows of the various assessment steps of the preferred embodiment of the invention are illustrated by way of three consecutive flow diagrams.

FIG. 7A gives an overview of the various steps performed during phase I, each of the steps corresponding to a pre-described category. After starting 400 phase I, along one path 410, steps 1-$n$ 420-440 are processed successively wherein a check is made to determine whether the minimum criteria are achieved. Along another path 450, minimum criteria 'mc' for the different categories or steps, respectively, are processed 460.

The minimum criteria 'mc' preferably are processed 460 using a logical string which looks like mc={yyy, yyy, yyy, ydd, ydd, yyy, yyd} for the example depicted in FIG. 5A. Herein 'y' indicates criteria which are regarded as necessary to allow proceeding with a next criterion, and 'd' (don't care) indicates that the underlying criterion is not a minimum criterion. The 'mc' strings needed for the different phases are preferably set by an experienced assessor in advance, and should not be amendable by way of any user interaction of a current assessor.

After the user has entered YES/NO answers for each of the criteria during steps 1-$n$ 420-440, the score values obtained in each of the categories (steps) are added 470 thus revealing a Phase 1 Value 480. In parallel, the status of actual criteria 490 are compared 500 with the predefined string of minimum criteria 'mc'. Only if the minimum criteria 'mc' are fulfilled 510, questions for each step of the next phase 520 will be worked on in the way described above. If not all minimum questions are answered with YES 530, the PVI evaluation is ended 540 and the assessor or user is prevented from answering any question of the following phases at all. In that case, the final PVI score is set to the calculated Phase 1 value 550.

In FIG. 7b the data flow of a technical implementation of steps within a phase of the example of step 1 within phase 1 is depicted. Starting 600 with question 1 610 of step 1 within phase 1, answering of questions 1 to 3 is processed by selecting 'YES' or 'NO'. The technical implementation sets the variable Q1 to the subscore related to the subcriterion 620, if the answer was 'YES' 630; or to '0' 640, if the answer was 'NO' 650. Continuing with 'question 2' 660, if the answer is 'YES' 670, the variable Q2 will be set to the related score 680 only if variable Q1 is not '0' 690, which means that the preceding subcriterion was fulfilled. Otherwise 700, the user receives an error message 710, that this subcriterion cannot be fulfilled without fulfilling the preceding one. If the user answers 'NO' 720, the variable Q2 will be set to '0' 730.

Continuing with 'question 3' 740, the proceeding is the same as for Q2. Finally the value and status for step 1 will be calculated 750. The value is derived by adding the scores (see FIG. 6) for questions answered with 'YES'. The status is derived from the logical state of each question and assembled in a bit string for the minimum criteria check. When the user, or assessor respectively, branches to the questions of the next phase, a check is made to determine whether the set of minimum questions of the previous phase was answered with 'YES'. Thereby, this minimum set of questions is derived from the criteria reflecting dependencies and exclusions, as described above.

FIG. 7C illustrates a technical process and data flow during phases n−1 through n. All steps are performed in the same manner as described above and depicted in FIG. 7B. The number of steps within a phase may vary. At the end of each phase, the score is summarized 800, 810 out of the scores of the various steps. Optionally a check against minimum criteria may take place at the end of each phase as described in FIG. 7A. The final score 820, the PVI value, is derived by adding 830 the subscores from all phases.

Figure 8:
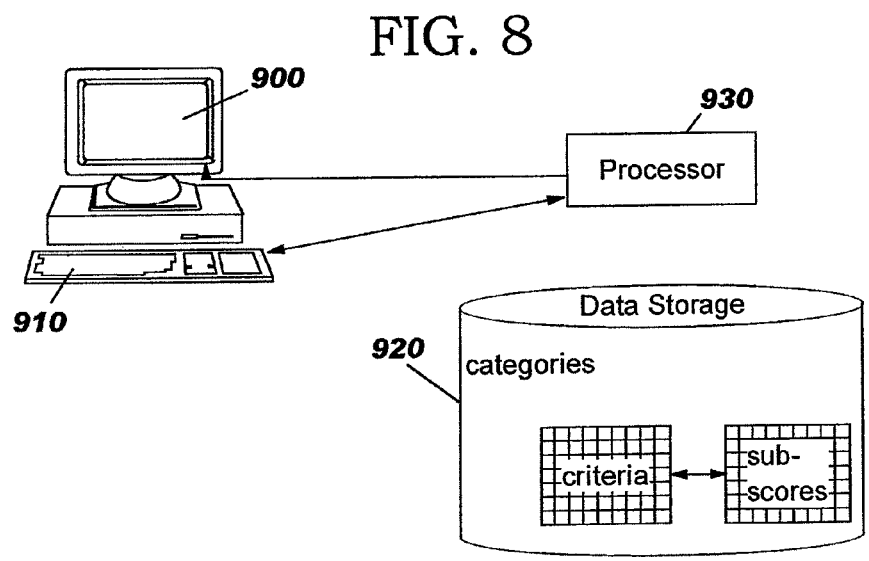
FIG. 8 shows a computer system environment for technical implementation of the invention.

A typical computer system environment for implementation of the invention, as depicted in FIG. 8, comprises a computer monitor 900 for displaying the binary questions to a user of the system and a computer keyboard 910 for receiving corresponding binary inputs from the user. The presented questions are structured on the display of monitor 900 in accordance with the above described binary decision tree.

Further a data store 920 is provided for storing the predescribed multitude of categories and, for each of the categories, a defined number of criteria indicative of generic maturity ratings for business processes. These data are already stored using the described binary decision tree structure wherein each node of the decision tree comprises a data structure in the computer providing a number of subscores for a corresponding criterion.

The computer system, in addition, comprises a software processing engine (processor) 930, or alternatively a hardware processor, which is connected to the data store 920. The processing engine 930 calculates subscores dependent on the values of the correspondents of the binary inputs. Based on the calculated subscores, the processing engine 930 further calculates a final score representing maturity of the evaluated process, using the methodology described above. The processing engine 930, in this embodiment, interlinks at least some of the nodes of the binary decision tree in view of dependencies to enforce specific binary inputs required due to these dependencies. In case of at least two assessment phases, each assessment phase including a number of categories. Transition between these assessment phases is forced by the processing engine 930, dependent on requirements to be fulfilled in a respective preceding phase.

It is to be understood hereby that the above implementation based on the PVI index is only exemplary and that the invention can also be used together with other indices characterizing process maturity.

Finally it is noted that a change over time in the obtained PVI score of a specific process is an indicator of an improvement and can be used as a basis for measurement of process improvement activities as required by the new edition of ISO 9001 "Quality Management Systems—Requirements", Ref. #ISO 9001:2000(E).

What is claimed is:

1. A computer program product stored on a computer usable medium, comprising computer readable program coded instructions for causing a computer to perform a method for computer-assisted comparative assessment of process maturity of business processes when said program is run on said computer, the product comprising: a first medium portion comprising code programmed to define a plurality of categories and, for each of said categories, defining a plurality of criteria indicative of maturity ratings for a process; a second medium portion comprising code programmed to map said criteria onto a binary decision tree, wherein each node of said binary decision tree comprises a data structure in a computer providing a plurality of subscores for a corresponding criterion and wherein defined criteria within a category comprise dependencies to each other; a third medium portion comprising code programmed to query a binary input for each of said criteria and providing subscores dependent on values of said binary inputs; a fourth medium portion comprising code programmed to calculate a final score representing maturity of the process, based on said subscores; and a fifth medium portion comprising code programmed to interlink at least two nodes of the binary decision tree with regard to said dependencies to enforce specific binary inputs required due to said dependencies.

2. The product of claim 1 wherein:

the at least two interlinked nodes comprises a first node and a second node;

the first node represents an answer to a yes-or-no question;

the second node represents an answer to a yes-or-no question that is to be obtained subsequently in time to the answer corresponding to the first node; and the answer corresponding to the second node will not be accepted if it is determined to be inconsistent with the answer corresponding to the answer corresponding to the first node.

* * * * *